Sept. 2, 1958 — A. N. BRUNSON — 2,849,911
OPTICAL TRANSIT SQUARE
Filed July 1, 1955 — 4 Sheets-Sheet 1
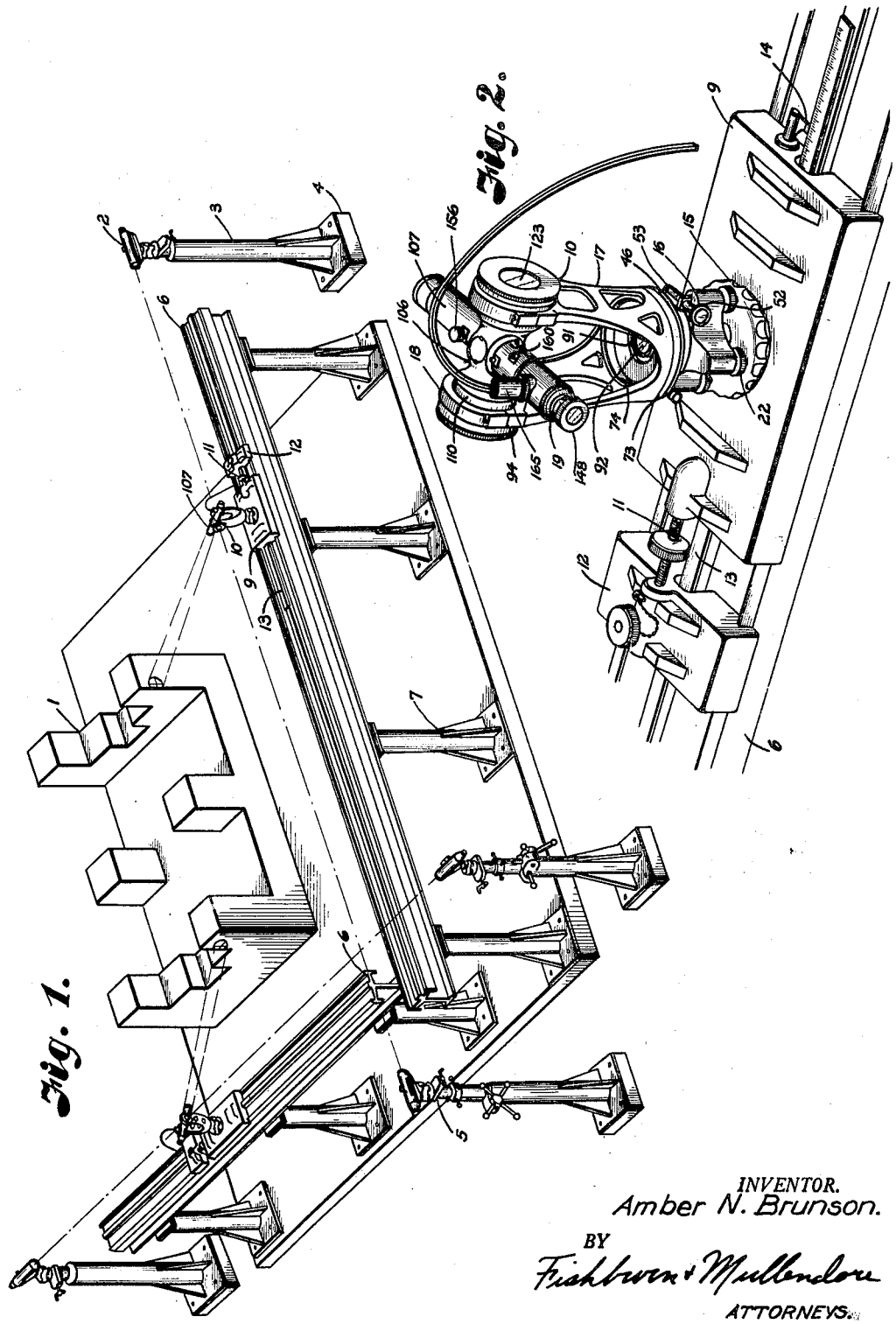
INVENTOR.
Amber N. Brunson.
BY Fishburn & Mullendore
ATTORNEYS.

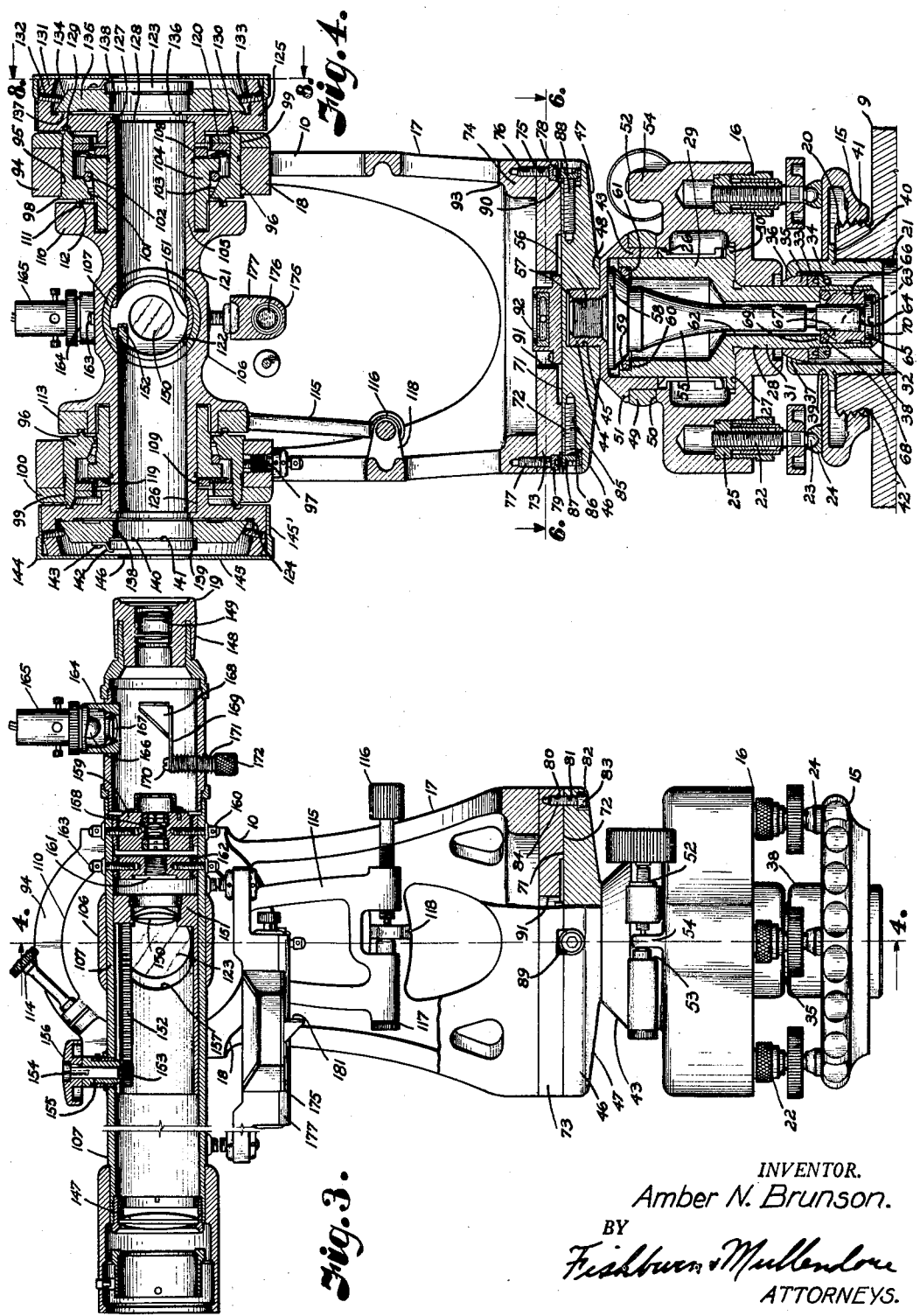

Sept. 2, 1958 — A. N. BRUNSON — 2,849,911
OPTICAL TRANSIT SQUARE
Filed July 1, 1955 — 4 Sheets-Sheet 3
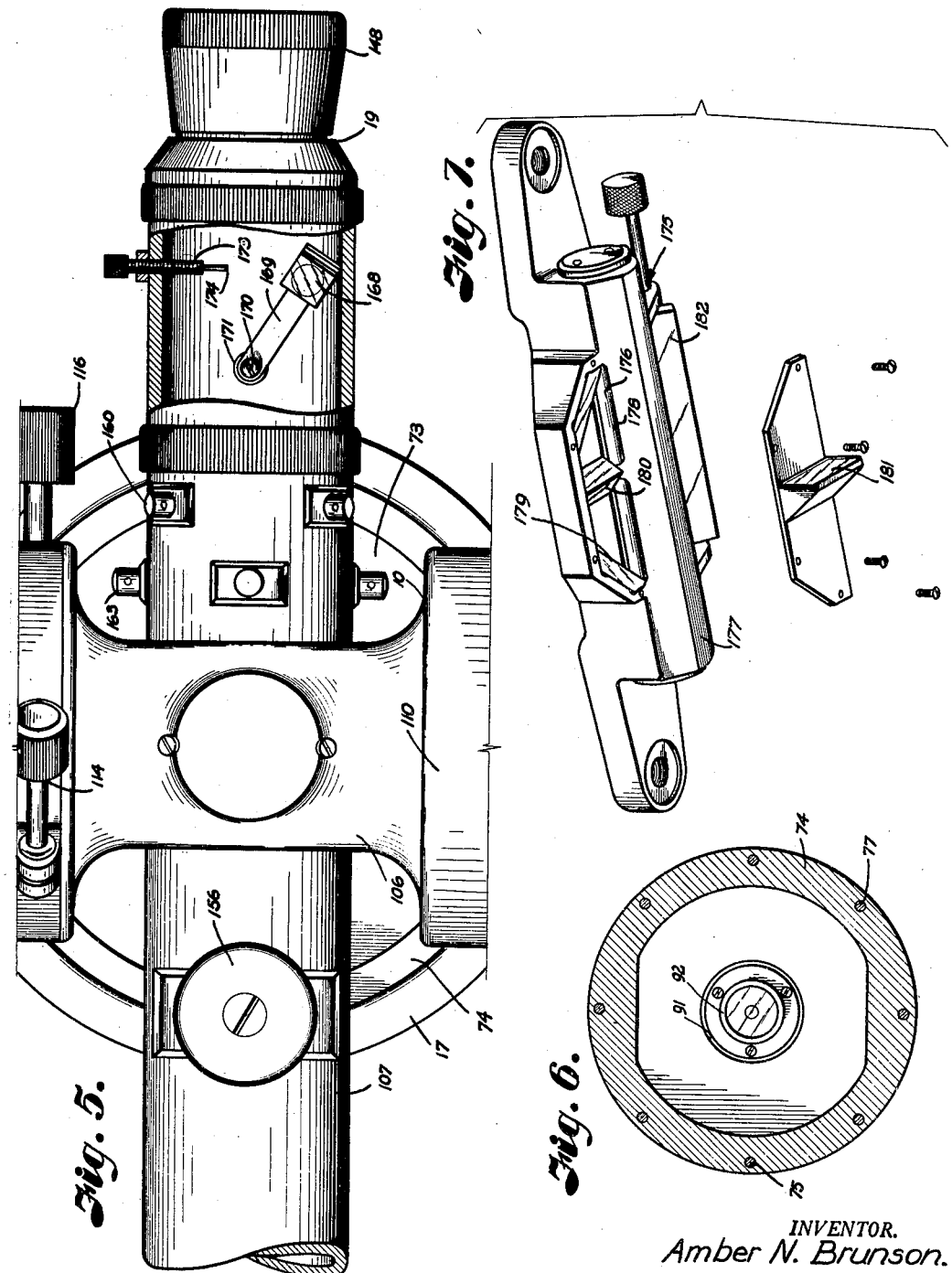
INVENTOR.
Amber N. Brunson.
BY
Fishburn + Mullendore
ATTORNEYS.

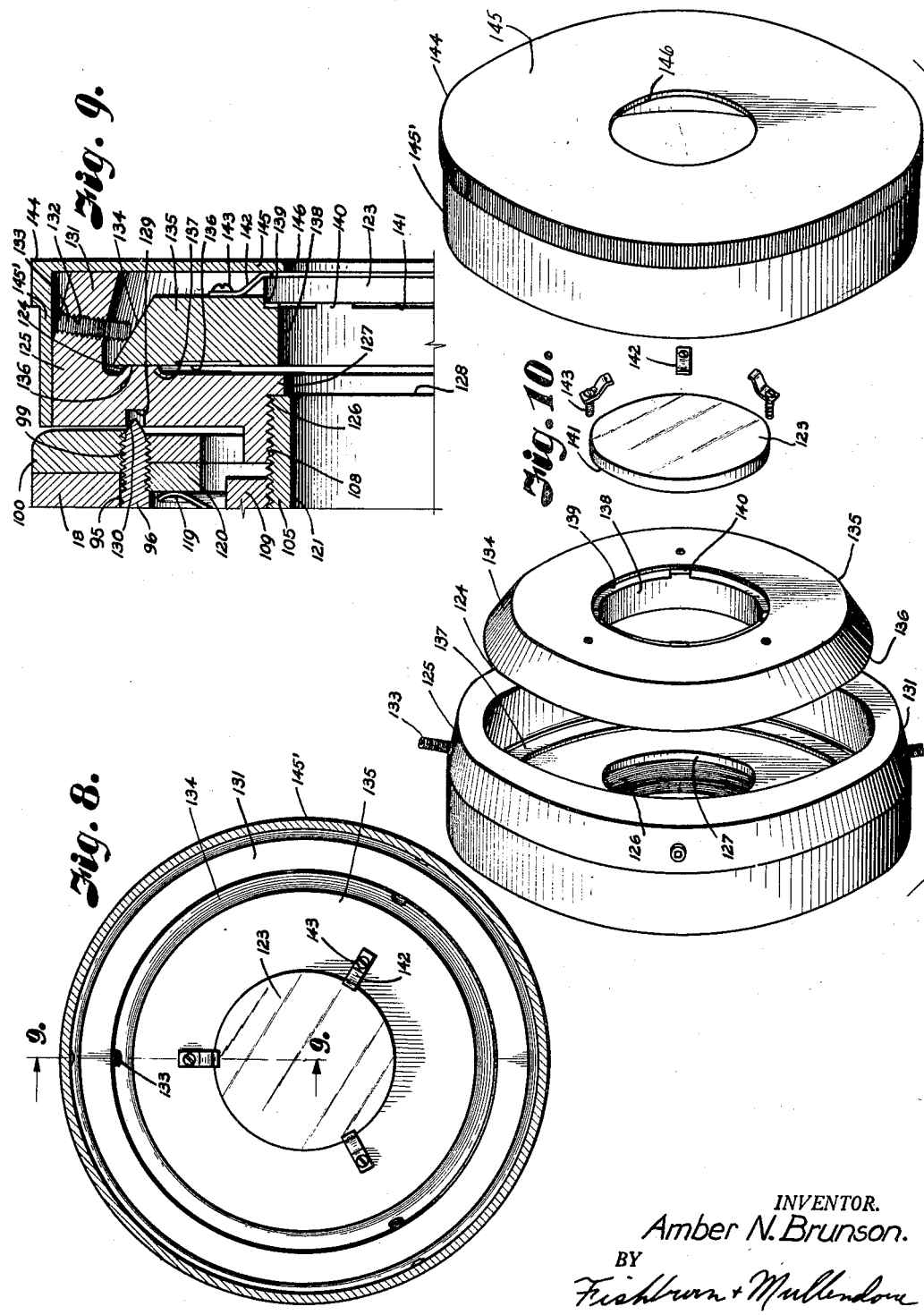

United States Patent Office 2,849,911
Patented Sept. 2, 1958

2,849,911

OPTICAL TRANSIT SQUARE

Amber N. Brunson, Kansas City, Mo., assignor to Brunson Instrument Company, Kansas City, Mo., a corporation of Missouri Application July 1, 1955, Serial No. 519,394

6 Claims. (Cl. 88—14)

This invention relates to instruments for optical alignment, and more particularly, to such devices for use in what is termed "optical tooling" which is essentially the establishment of an optical reference line parallel to one axis of the object being worked upon, then the establishment of optical planes at right angles to that basic reference line.

In the setting up, positioning and alignment of parts of large machines, jigs and the like, and making accurate measurements in connection with lofting of large structures, it is very difficult to make the necessary measurements by linear measuring devices, and even more difficult to project the measurements into complex structures such as airplanes, airplane wings and large machines and the like, whereby critical points or positions can be located with desired precision. In order to aid in determining critical points of an object, particularly those in out of the way places, with some precision, conventional transits have been utilized in what is termed "optical tooling." However, even with such optical instruments, various difficulties have been encountered in accurately positioning the instruments whereby the axis of the telescope of the transit is on the desired reference line and in determining that the telescope of the transit would move in a plane perpendicular to the reference line or in otherwise checking and determining that measurements or points located are accurate. Also, when the work required the location of a number of critical points, and particularly where such points needed to be checked at intervals, it has been found to be very difficult and time-consuming to move the transits to make the required measurements, and inaccuracies occurred in the movement of the transits.

The objects of the present invention are to provide, an optical instrument in the form of an optical transit square that will eliminate the difficulties and inaccuracies occurring in the operations above mentioned; to provide optical tooling equipment including alignment telescopes and tooling bars for establishing a reference line parallel to one axis of an object being worked upon and one or more optical transit squares movably mounted on the tooling bar with through openings at the axes of the transit telescopes and optical flat windows and semi-transparent mirrors perpendicular to said axes or parallel to the line of sight of the telescope whereby the transits and alignment telescopes cooperate to permit quick, precise determination of planes perpendicular to the reference line by auto-reflection and/or auto-collimation; to provide a base member slidably mounted on the tooling bars and adjustably connected to a clamp member thereon and a vernier for accurately establishing positions of optical transit squares longitudinally of the tooling bar; to provide a mounting of the optical transit square on the movable base whereby said transit may be removed and replaced in substantially the same relative position; to provide an optical transit square with telescope axis and spindle mountings characterized by substantially dust-free operation and long life free of wear and inaccuracy from friction; to provide such a transit with an adjustable plate assembly for lateral movement of the telescope relative to the spindle axis; to provide such a transit with standards which combine light weight and strength in a manner to substantially eliminate twist or deflection due to variations in temperature in the vicinity of operations; to provide such a transit with a telescope having a coincident level vial for facilitating operation and accuracy; to provide such a transit with a telescope with a source of light which is directed into the barrel behind a reticle containing internal cross wires and a reflecting mirror for projecting the image of the cross wires to other optical transit squares or the work piece for alignment and location operations; to provide such a transit with a through opening at the axis of the transit's telescope and optical flat clear windows and partially coated or semi-transparent mirrors with adjustable mounting thereon for accurately positioning the flats perpendicular to the axes of the trunnions of the telescope; and to provide optical tooling equipment of the character described that can be quickly and easily adjusted to accurate alignment and positioning, checked and utilized for extreme precision and consistency in close measurement and extreme accuracy in the locating of planes and points for more precision as well as speed in the construction and setting up of complex structures.

In accomplishing these and other objects of the present invention, I have provided improved details of structure, the preferred forms of which are illustrated in the accompanying drawings, wherein:

Fig. 1 is a perspective view of an arrangement of tool bars, alignment scopes and optical transit squares as applied to a tooling operation.

Fig. 2 is an enlarged perspective view of an optical transit square and base mounting on a portion of a tooling bar.

Fig. 3 is a side elevation of the optical transit square with portions broken away to illustrate the structure and parts thereof including the telescope.

Fig. 4 is a vertical sectional view through the transit square on the line 4—4, Fig. 3.

Fig. 5 is an enlarged partial plan view of the telescope with portions broken away to illustrate the light-reflecting mirror therein moved to inoperative position.

Fig. 6 is a horizontal sectional view through the transit standard taken on the line 6—6, Fig. 4.

Fig. 7 is an enlarged detailed perspective view of the coincident vial partially disassembled.

Fig. 8 is a transverse sectional view through the transit taken on the line 8—8, Fig. 4.

Fig. 9 is an enlarged sectional view through the partially coated mirror optical flat mounting taken on the line 9—9, Fig. 8.

Fig. 10 is an enlarged disassembled perspective view of the parts of the optical flat partially coated mirror mounting.

Referring more in detail to the drawings:

1 designates an example of a large structure or work piece presenting complexities in measurements and location of points whereby usual linear measuring instruments are inadequate. The structure 1 is exemplary only and may be an aircraft part such as a fuselage or wing or assembly jigs therefor, a machine tool or work to be machined, a ship or the lofting of such a structure. In using optical instruments in connection with such work, it is desirable to establish at least one optical reference line parallel to one axis of the object being worked upon, and in some structures it is desirable to establish additional reference lines perpendicular to or otherwise located relative to the first reference line, or to an axis of the object.

In the arrangement illustrated in Fig. 1, two reference lines are located by means of alignment telescopes 2 adjustably supported by stands 3, fixed on suitable supports 4 with the stands 3 arranged in pairs whereby a pair of stands is substantially in the plane of the reference line desired. One or more of the stands in each pair is adjustable for variation in the height of the alignment scope mounted thereon, and is also provided with an adjustable cross-head 5 for lateral adjustment of the alignment telescope carried thereon. Each of the alignment telescopes preferably is arranged with a vertical spindle and leveling screws and level vials to aid in positioning and aligning of the telescopes. It is preferable that one or both of the telescopes 2 in each pair have a source of light, a reflecting mirror, a reticle, together with suitable objective focusing, erector and eye piece lenses, whereby the instrument has the ability to project the image of the cross wires of the reticle and the reflection viewed through the eye piece; however, a collimator may be substituted for one of the telescopes 2 in each pair and utilized with the other telescope for establishing the desired reference line.

Tool bars 6 are mounted on suitable supports 7 and adjusted whereby ways on said tool bars are parallel with the respective reference lines established by the respective alignment scopes. The tool bars 6 are adapted to slidably mount base members 9 each of which removably supports an optical transit square 10, later to be described. Each of the base members 9 are adjustably connected by a screw or the like 11 to a member 12 suitably and removably anchored on the respective tool bar. The member 12 is movable to selected positions on the tool bar 6 and has a linear measuring scale 13 fixed thereto and extending under the base member 9 whereby a vernier 14 on the base member 9 may be read to determine the linear distance of a selected portion of the base member from a fixed reference point determined by the positioning of the member 12 on the tool bar, the scale 13 and vernier 14 and the member 12 being such that the linear position of the spindle of the optical transit square 10 relative to a fixed reference point may be determined.

In the structure illustrated, the alignment telescopes, their mountings and the tool bars are for illustration purposes and their individual structures per se form no part of the present invention.

The optical transit square 10 generally consists of a foot plate 15, leveling head 16, standards 17, which have bearings 18 thereon rotatably mounting a telescope 19. The optical transit square 10 is removably mounted and secured on the base member 9. The base member 9 has an upstanding externally threaded boss 20 with an axial accurately reamed or otherwise machined bore 21 for receiving and centering structure for supporting the transit 10. The support structure for the transit 10 includes the foot plate 15 on which a leveling head 16 is supported by a plurality of screws 22, each of the screws 22 terminating in a ball member 23 which engages in a socket in a foot member 24 on the foot plate 15. The screws 22 also engage in threaded bushings 25 on the leveling head 16. The leveling head 16 has a bore 26 in the upper portion thereof terminating in a shoulder 27 and a reduced bore 28 coaxial with the bore 26 and extending from the shoulder 27 to the lower end of the leveling head. A hollow post 29 is fitted within the bore 26 and includes a shoulder 30 engaging the shoulder 27 and an extension 31 which projects through the reduced bore 28. The post 29 includes a lower threaded portion 32 which is engaged by nuts 33 and 34 which retain a collar 35 on the post, said collar having a spherically curved portion 36 engaging a similar surface on a flange 37 on the upper end of a centering ring 38 that extends through a bore 39 in the foot plate 15. The centering ring has a lower end accurately machined to fit in the bore 21 of the base 9. The centering ring 38 has a flange 40 which extends between a portion of the foot plate and the boss 20. The foot plate 15 has a depending flange 41 provided with internal threads 42 adapted to be threaded on the boss 20 to draw the flange 40 into engagement with said boss 20 for cooperation with the lower end of the centering ring 38 and bore 21 in removably mounting the transit 10 on the base member 9 and accurately position said transit relative thereto.

A collar 43 is sleeved on the upper end of the post 29 and has an externally threaded upstanding axial stud 44 which is threaded into a bore 45 in a lower plate 46 whereby the bottom surface 47 on said plate engages a shoulder 48 on the collar 43. A clamp ring 49 engages between a shoulder 50 on the head 16 and a flange 51 on the collar 43, said clamp ring as shown including a clamp screw assembly 52 and a slow motion assembly 53 which connects the collar 43 to the head 16 through a lug 54 on the head 16.

A spindle 55 is arranged in the hollow post 29 and has an upper threaded end 56 screwed into a threaded bore 57 in the stud 44. The spindle includes an annular flange 58 provided with an inclined shoulder 59 which engages ball bearings 60 arranged in an annular groove 61 in the upper portion of the hollow post 29. The spindle extends through a reduced bore 62 of said hollow post substantially to the end thereof and has an axial threaded bore 63 into which is threaded the shank 64 of a screw 65, the head of which engages a collar 66 having an upper inclined end 67 engaging ball bearings 68 whereby said ball bearings are between the inclined end 67 and a shoulder 69 in the hollow post 29, and tightening of the screw 65 will adjust the bearings to eliminate end play of the spindle. A dust cap 70 is secured in the lower end of the hollow post 29 to close the bore thereof.

The plate 46 has a flat upper surface 71 which is engaged by the surface 72 of an intermediate plate 73 and a ring member 74 is mounted on the upper surface of the intermediate plate 73 whereby said ring member 74 constitutes the base portion of each of a pair of standards 17. The intermediate plate 73 has a plurality of apertures 75 extending therethrough and in alignment with threaded apertures 76 extending into the bottom of the ring portion 74 for receiving suitable fastening devices such as screws 77, the lower portion of the apertures 75 being countersunk as at 78 for receiving the heads 79 of the screws 77 whereby the lower portion of the heads 79 are above the surface 71 of the plate 46, and the screws 77 rigidly secure the base ring 74 to the intermediate plate 73. The intermediate plate has threaded openings 80 extending upwardly therein in spaced relation to the apertures 75. The threaded openings 80 align with bores 81 in the plate 46 and the lower ends of the bores 81 are countersunk as at 82 for receiving the heads 83 of screws 84 or other suitable fastening devices for securing the intermediate plate to the plate 46. The bores 81 and countersunk portions 82 are larger than the shanks of the screws 84 and the head 83 thereof to permit relative lateral movement or adjustment of the intermediate plate 73 relative to the plate 46 when the screws are loose. In order to effect such lateral movement, the plate 46 is provided with diametrically opposed threaded bores 85 extending laterally therein adjacent the upper surface 71 with the outer ends of said bores countersunk as at 86 to receive heads 87 of screws 88 threaded into the threaded bores 85, the heads 87 being of such size that the upper portion thereof extends above the surface 71 of the plate 46. The intermediate plates are provided with grooves 89 in the lower portion thereof which terminate in shoulders 90 adapted to be engaged by the screw heads 87. The grooves 89 extend into the intermediate plate for a distance less than the depth of the countersunk portion 86 whereby when the screws 84 are loose, the screws 88 may be turned to effect lateral movement of the intermediate plate relative to the plate 46, and then the screws 84 retightened to retain said plates in the adjusted position. The screws 88 are preferably substantially parallel to the axis of the telescope trunnions supported on the standards 17, as later described, whereby the adjustment of the intermediate plate will move the plane of the line of sight of the telescope transversely.

The intermediate plate 73 preferably has a centrally located aperture 91 whereby a level vial 92 positioned on the upper surface 71 of the plate 46 and secured thereto by suitable fastening devices is visible from above said intermediate plate 73. The standards 17 are of an open structure for lightness of weight and are arcuate in horizontal cross section with the side edges sloping outwardly whereby the lower portions of opposite standard are connected as at 93 forming a rib above the ring 74, the shape of the standards being such that variations in temperatures cannot cause a twist and the standards will maintain the upper portions in suitable alignment to accurately support the telescope under such variations in temperature.

The bearings 18 are carried on the upper ends of the standards 17 and include split bearing members 94 and have bores 95 therein for receiving sleeves 96 which are held in place by the clamping action of the split bearing members 94 and by set screws 97 in said split bearing members, which set screws also can be used to cooperate with the split bearings in providing some adjustment for the axis of the trunnions of the telescope 19 as later described.

The sleeves 96 each have an annular flange 98 which engages the inner or adjacent ends of the split bearing members 94 and said sleeves extend through the split bearings and have external threads 99 on the portions extending from the other ends of the split bearings on which are threaded nuts 100 to cooperate with the flanges 98 in anchoring the sleeves 96 in said split bearing members 94. The sleeves 96 have outwardly tapered bores 101 forming outer races for engaging ball bearings 102 supported in grooves 103 of inner races 104 which are sleeved on trunnion members 105 that extend from each side of a sleeve 106 which supports the telescope barrel 107. The outer ends of the trunnion members 105 are provided with external threads 108 on which are threaded nuts 109 which adjust the inner races 104 to arrange the ball bearings to rotatably support the trunnion members of the telescope mounting and limit end play thereof.

The trunnion members each have flanges 110, one of the flanges being provided with a groove 111 in which is engaged an annular rib 112 on the adjacent sleeve 96 to form a seal. The other flange has a portion of reduced size to receive a clamping ring 113, having a clamp screw 114. The ring 113 has a locking arm 115 extending downwardly therefrom provided with a clamping screw 116 and slow motion mechanism 117 which engage a lug 118 on the adjacent standard 17 for accurately positioning and retaining the telescope in regard to rotation thereof about the axis of the trunnions. Held between the nut 109 and the inner race 104 is a resilient seal member 119, the outer portion of which resiliently engages the inner surface of nuts 120 threaded into the outer portion of the bore of the sleeve 96. The trunnions each have through axial bores 121 which register with openings 122 in opposite sides of the telescope barrel 107 to provide for sighting therethrough transversely of the line of sight of the telescope and for directing a light beam therethrough for alignment purposes as later described, the openings being covered at each end by window structures and mountings to prevent dust and the like entering into the telescope barrel.

Optical flat windows or partially coated mirrors 123 are suitably mounted at the ends of the trunnions and are adjustably carried by mounting structure 124 whereby the surfaces of the optical flats are perpendicular to the axis of the trunnion members 105 and thereby parallel to the line of sight of the telescope 19. The partially coated or semi-transparent mirror is the same as the optically flat window except that it is coated to provide some reflection of light and some passage of light therethrough. The coating may be as desired to provide the proportion of reflected light desired. In the illustrated structure, the mounting structure 124 consists of a ring member 125 having a threaded bore 126 threaded on to the outer ends of the threaded portion 108 of the trunnions, the bores 126 being provided with shoulders 127 which engage the outer ends 128 of said trunnions. The adjacent faces of the ring members are provided with grooves 129 which are engaged with tapered ends or ribs 130 at the outer ends of the sleeves 96 to provide a dust seal. Each of the ring members 125 are provided with outwardly extending peripheral flanges 131 having a plurality of threaded apertures 132 spaced therearound and from the ring member and inclined toward said ring member whereby adjusting screws 133 threaded in the threaded apertures 132 have their inner ends engaged with beveled surfaces 134 of plates 135 provided with inner faces 136 which are accurately machined with a spherical contour of relatively large radius that conform to the outer spherical surfaces of ribs 137 extending outwardly from the ring members 125 and spaced inwardly from the peripheral flanges 131 and substantially concentric with the axis of the trunnions. It is found desirable that the radius of the spherical contours be relatively large and in actual structures a 400-inch radius has been found to be satisfactory. The arrangement of the screws 133 holds the plates 135 whereby the spherical contours are engaged and an adjustment of the screws 133 will vary the position of the plates 135 whereby the optical flats 123 may be adjusted to accurately position the surfaces thereof perpendicular to the axis of the trunnions of the telescope 19.

The plates 135 are provided with axial bores 138 which align with the bores 121 of the trunnions and the outer ends of the plates are provided with counter bores 139 arranged to provide spaced lugs 140 therein. The optical flat windows or partially coated mirrors 123 have the marginal portions of the inner faces 141 thereof engaged with the lugs 140 and are held in such engagement by clips 142 which are secured by suitable fastening devices 143 to the plate 135. Cap members 144 have end walls 145 provided with axial bores 146 substantially the same diameter as the bores 121 in the trunnions. The cap members are also provided with peripheral flanges 145' which are sleeved over and frictionally engage the peripheral flanges 131 to retain the cap members 144 in position.

The telescope barrel 107 has an objective lens 147 mounted in one end thereof and an adjustable eye piece 148 carrying eye piece lenses 149 and arranged whereby movement of the eye piece will adjust the focus of the eye piece lenses. A focusing lens 150 is suitably supported in a slide member 151 slidably mounted longitudinally of the telescope barrel 107 intermediate the length thereof. The slide member 151 has a gear rack 152 operatively engaged by a gear pinion 153 mounted on a shaft 154 rotatably mounted in a bearing 155 and extending exteriorly of the barrel, a knob 156 being provided on the shaft 154 for turning the gear pinion and moving the slide 151 to move the focusing lens to suitably focus the telescope 19.

The slide 151 is preferably in the form of a sleeve having apertures 157 in each side thereof registerable with the apertures 122 in the barrel when the focusing lens is moved substantially to the end of its travel toward the eye piece whereby the focusing lens and its mounting will not interfere with sighting through the bore 121 transversely of the line of sight of the telescope 19. Arranged in the telescope barrel 107 in spaced relation to the eye piece 148 and intermediate the eye piece and the focusing lens are erector lenses 158 which are adjustably carried by an erector lens ring 159 with screws 160 arranged in the telescope barrel to adjust the axis of the lens 158. A reticle 161 is carried by a ring 162 intermediate the erector lens assembly and the focusing lens, said ring 162 being adjusted by screws 163 to center the reticle, which may be cross hairs, relative to the line of sight through the lenses of the telescope 19.

The telescope barrel is preferably provided with a tubular member 164 extending radially therefrom adjacent the mounting of the eye piece 148, said tubular member being such that a light bulb socket member 165 may be connected thereto whereby a light bulb 166 will be arranged in the tubular member. The inner end of the tubular member is provided with a filter and collimating lens 167 whereby when the light bulb 166 is connected to a suitable source of energy, rays of light will be projected into the telescope barrel between the eye piece lens and the erector lens and substantially transversely of said barrel. A prismatic partially coated or semi-transparent mirror 168 is mounted on one end of an arm 169, the other end of which is secured to a shaft 170 rotatably supported in a threaded bushing 171 which extends through the wall of the telescope barrel 107. An adjusting knob 172 is mounted on the outer end of the shaft 170 for swinging the arm 169. An adjustable stop screw or abutment 173 is adjustably mounted in the telescope barrel 107 whereby the end 174 thereof will engage the partially coated prismatic mirror 168 when the arm 169 is swung to a position whereby the rays of light from the light bulb 166 are reflected axially through the telescope barrel to project the reticle on an object at a distance from the telescope. When it is not desired to reflect the light rays through the telescope lenses, the prismatic mirror 168 is swung to one side as illustrated in Fig. 5 out of the line of sight through the various lenses in the telescope 19.

A coincidence vial 175 is suitably mounted on the telescope barrel 107 and includes the vial 176 mounted in a housing 177 and provided with side openings 178 having prisms 179 which cooperate with a prism 180 to direct a view of the bubble in the vial to a prism 181 arranged whereby the view of the bubble in the vial is seen by the user from the end of the telescope having the eye piece thereon. The coincidence vial has a mirror 182 thereon for aiding in directing light through the vial and also for viewing the bubble therein from other angles when desired.

Assuming the tool bar 6 and alignment scopes 2 have been arranged as described, the alignment scopes are then adjusted to establish a permanent optical reference line parallel to one axis of the object being worked upon. One or more of the optical transit squares 10 are then arranged on bases 9 which are moved along the tooling bars and said bases adjusted whereby the vertical axis of the bore 21 is substantially at the desired linear dimension relative to the object to be worked upon, the reference line established by the alignment telescopes being of such height as to be level with the axis through the trunnions of the optical transit square 10. The leveling screws 22 are then adjusted until the level vial 92 indicates that the plate 46 is substantially level. If desired, one of the optical transit squares may be arranged whereby the telescope thereon is substantially level as indicated by the coincident vial 175 and said telescope turned toward one of the alignment telescopes 2 and the light 166 energized to project the reticle toward the alignment telescope whereby the optical transit square 10 serves as a collimater to aid in determining and establishing the permanent optical reference line. In this manner, the optical transit square 10 may serve as an alignment telescope or as a collimater. Then the optical transit square 10 is rotated whereby the axis of the trunnions is substantially in alignment with the optical reference line and the alignment telescope 2 utilized to project the reticle image toward the optical flat partially coated or semi-transparent mirror 123 on the optical transit square 10. The leveling screws 22 and slow motion assembly 53 are then manipulated until the reticle image of the alignment telescope is reflected directly back upon itself by the partially coated mirror 123 and when such alignment occurs, the line of sight of the telescope of the optical transit square should be exactly at right angles to the permanent optical reference line or to the axis of the object being worked upon. Sweeping the optical transit square telescope up and down establishes an exact vertical plane, and enables the setting of points in that plane. In order to check the accuracy of the position of the vertical plane of sight of the telescope of the optical transit square, said telescope is rotated substantially 180° about the axis of the trunnions and the clamping screw 52 loosened whereby the plate 46 and structure carried thereby is rotated about the axis of the spindle for substantially 180°. The reticle image is again projected by the alignment telescope 2 to the partially coated or semi-transparent mirror 123, and the slow motion mechanism 53 adjusted until the reticle image of the alignment telescope is reflected directly back upon itself by the partially coated mirror 123. Then the telescope of the optical transit square 10 is swept up and down to determine if the points previously located in the vertical plane are still in the line of sight of the telescope. If the two planes of the transit telescope 19 by the above tests are offset then the screws 84 are loosened and the screws 88 adjusted to move the axis of the telescope approximately one-half the distance between the two vertical planes, whereby repetition of the tests result in the plane of the line of sight of the telescope coinciding when the position of the optical transit square and telescope thereof are reversed as above described. The screws 84 are then tightened to hold the instrument in the desired adjustment. It is preferable that one of the optical flats 123 be a partially coated or semi-transparent mirror and the other merely serving as a window. Then, in such tests to determine accuracy of alignment and positioning, the reflection of the reticle of the alignment telescope is from the same optical flat partially coated mirror.

In most operations, more than one optical transit square 10 will be utilized on each tooling bar 6. When one optical transit square is accurately positioned with the axis through the trunnions of the telescope aligned with the permanent optical reference line established by the alignment telescope, the positioning and alignment of the next optical transit square may be determined and adjusted in the same manner as the line of sight of the alignment telescope and is such that the retical image will be directed through the first optical transit square and be reflected from the optical flat partially coated or semi-transparent mirror on the next optical transit square by merely adjusting the focus of the alignment telescope. Therefore, each of the optical transit squares may be adjusted and positioned as required without disturbing the alignment and positioning of the other optical transit squares on the same tooling bar.

When it is desired to accurately mark points on the object to be worked upon, the telescope of the respective optical transit square is sighted to determine the point and then the light 166 is energized and the prismatic partially coated or semi-transparent mirror 168 swung into alignment whereby the light rays are reflected to project the reticle in the optical transit square telescope 19 on to the desired point of the work whereby an operator can easily mark same.

It is believed obvious I have provided optical instruments for use in optical tooling whereby critical points in all three dimensions of an object, even those in out of the way places, can be located with extreme precision and speed.

What I claim and desire to secure by Letters Patent is:
1. An optical sighting instrument of precision for accurately determining lines or planes perpendicular to an optical reference line comprising, a telescope having a barrel containing aligned lenses for view of objects in the line of sight thereof, opposed trunnions extending from the telescope barrel, means for adjusting the line of sight of said telescope perpendicular to the axis of the trunnions, bearings supporting said trunnions for rotation about their axis, an adjustable standard supporting said bearings, means rotatably mounting said standard for rotation about a vertical axis perpendicular to the axis of the trunnions, said trunnions and telescope barrel having aligned sight openings extending entirely therethrough substantially axially of the trunnions, a semi-transparent mirror having a plane reflecting surface mounted on one of the trunnions so that the plane of the reflecting surface is perpendicular to the axis of the trunnions and thereby parallel to the plane generated by the line of sight of the telescope as the telescope is rotated on its trunnions, and mounting means for said semi-transparent mirror for positioning the plane reflecting surface of said mirror perpendicular to the axis of said trunnions, the perpendicularity of the plane reflecting surface to the axis of the trunnions being determinable by observing a fixed point in the line of sight of the telescope while observing through another optical instrument having fixed location an image reflected from said plane reflecting surface and then rotating the standard 180° about its axis and rotating the telescope 180° about the axis of its trunnions whereby the image reflected from the opposite side of the plane reflecting surface may again be observed through said other optical instrument while observing said fixed point in the line of sight of said telescope, whereby points may be located in a plane perpendicular to the optical line of sight of another optical instrument by adjusting said standard to make the axis of said trunnions parallel to the optical line of sight of said other optical instrument being reflected from said plane reflecting surface backward into said other optical instrument and sighting through said telescope carried on said trunnions while said instrument is so adjusted.

2. An optical sighting instrument of precision for accurately determining lines or planes perpendicular to an optical reference line comprising, a telescope having a barrel containing aligned lenses for view of objects in the lien of sight thereof, opposed trunnions extending from the telescope barrel, means for adjusting the line of sight of said telescope perpendicular to the axis of the trunnions, bearings supporting said trunnions for rotation about their axis, an adjustable standard supporting said bearings, adjustable means on the trunnions and standard engaging said bearings for retaining said trunnions and telescope against lateral movement relative to the standard, means rotatably mounting said standard for rotation about a vertical axis perpendicular to the axis of the trunnions, said trunnions and telescope barrel having aligned sight openings extending entirely therethrough substantially axially of the trunnions, the end of one of the trunnions having an end face portion of spherical contour of relatively large radius with the center of said spherical contour being substantially on the line of the trunnion axis, a ring member having a face portion of spherical contour corresponding to and engaged with the spherical contour of the end face portion of said one trunnion, said ring member having a central opening aligned with the sight opening in the trunnions, a semi-transparent mirror having a plane reflecting surface mounted on the ring member in covering relation with the central opening thereof so that the plane of the reflecting surface is perpendicular to the axis of the trunnions and thereby parallel to the plane generated by the line of sight of the telescope as the telescope is rotated on its trunnions, and adjusting means on said one trunnion and engaging said ring member for holding said spherical contours engaged and moving the ring member laterally of the trunnion axis for positioning the plane reflecting surface of said mirror perpendicular to the axis of said trunnions, the perpendicularity of the plane reflecting surface to the axis of the trunnions being determinable by observing a fixed point in the line of sight of the telescope while observing through another optical instrument having fixed location an image reflected from said plane reflecting surface and then rotating the standard 180° about its axis and rotating the telescope 180° about the axis of its trunnions whereby the image reflected from the opposite side of the plane reflecting surface may again be observed through said other optical instrument while observing said fixed point in the line of sight of said telescope, whereby points may be located in a plane perpendicular to the optical line of sight of another optical instrument by adjusting said standard to make the axis of said trunnions parallel to the optical line of sight of said other optical instrument as determined by an image on the line of sight of said other optical instrument being reflected from said plane reflecting surface backward into said other optical instrument and sighting through said telescope carried on said trunnions while said instrument is so adjusted.

3. An optical sighting instrument of precision for accurately determining lines or planes perpendicular to an optical reference line comprising, a telescope having a barrel containing aligned lenses for view of objects in the line of sight thereof, opposed trunnions extending from the telescope barrel, means for adjusting the line of sight of said telescope perpendicular to the axis of the trunnions, bearings supporting said trunnions for rotation about their axis, an adjustable standard supporting said bearings, adjustable means on the trunnions and standard engaging said bearings for retaining said trunnions and telescope against lateral movement relative to the standard, means rotatably mounting said standard for rotation about a vertical axis perpendicular to the axis of the trunnions, means for moving the standard laterally relative to said vertical axis for adjusting the plane generated by the line of sight of the telescope relative to said vertical axis, said trunnions and telescope barrel having aligned sight openings extending entirely therethrough substantially axially of the trunnions, a semi-transparent mirror having a plane reflecting surface mounted on one of the trunnions so that the plane of the reflecting surface is perpendicular to the axis of the trunnions and thereby parallel to the plane generated by the line of sight of the telescope as the telescope is rotated on its trunnions, and mounting means for said semi-transparent mirror for positioning the plane reflecting surface of said mirror perpendicular to the axis of said trunnions, the perpendicularity of the plane reflecting surface to the axis of the trunnions being determinable by observing a fixed point in the line of sight of the telescope while observing through another optical instrument having fixed location an image reflected from said plane reflecting surface and then rotating the standard 180° about its axis and rotating the telescope 180° about the axis of its trunnions whereby the image reflected from the opposite side of the plane reflecting surface may again be observed through said other optical instrument while observing said fixed point in the line of sight of said telescope, whereby points may be located in a plane perpendicular to the optical line of sight of another optical instrument by adjusting said standard to make the axis of said trunnions parallel to the optical line of sight of said other optical instrument as determined by an image on the line of sight of said other optical instrument being reflected from said plane reflecting surface backward into said other optical instrument and sighting through said telescope carried on said trunnions while said instrument is so adjusted.

4. An optical sighting instrument of precision for accurately determining lines or planes perpendicular to an optical reference line comprising, a telescope having a barrel containing aligned lenses for view of objects in the line of sight thereof, opposed trunnions extending from the telescope barrel, means for adjusting the line of sight of said telescope perpendicular to the axis of the trunnions, bearings supporting said trunnions for rotation about their axis, an adjustable standard supporting said bearings, adjustable means on the trunnions and standard engaging said bearings for retaining said trunnions and telescope against lateral movement relative to the standard, means rotatably mounting said standard for rotation about a vertical axis perpendicular to the axis of the trunnions, means for moving the standard laterally relative to said vertical axis for adjusting the plane generated by the line of sight of the telescope relative to said vertical axis, said trunnions and telescope barrel having aligned sight openings extending entirely therethrough substantially axially of the trunnions, the end of one of the trunnions having an end face portion of spherical contour of relatively large radius with the center of said spherical contour being substantially on the line of the trunnion axis, a ring member having a face portion of spherical contour corresponding to and engaged with the spherical contour of the end face portion of said one trunnion, said ring member having a central opening aligned with the sight opening in the trunnions, a semi-transparent mirror having a plane reflecting surface mounted on the ring member in covering relation with the central opening thereof so that the plane of the reflecting surface is perpendicular to the axis of the trunnions and thereby parallel to the plane generated by the line of sight of the telescope as the telescope is rotated on its trunnions, and adjusting means on said one trunnion and engaging said ring member for holding said spherical contours engaged and moving the ring member laterally of the trunnion axis for positioning the plane reflecting surface of said mirror perpendicular to the axis of said trunnions, the perpendicularity of the plane reflecting surface to the axis of the trunnions being determinable by observing a fixed point in the line of sight of the telescope while observing through another optical instrument having fixed location an image reflected from said plane reflecting surface and then rotating the standard 180° about its axis and rotating the telescope 180° about the axis of its trunnions whereby the image reflected from the opposite side of the plane reflecting surface may again be observed through said other optical instrument while observing said fixed point in the line of sight of said telescope, whereby points may be located in a plane perpendicular to the optical line of sight of another optical instrument by adjusting said standard to make the axis of said trunnions parallel to the optical line of sight of said other optical instrument as determined by an image on the line of sight of said other optical instrument being reflected from said plane reflecting surface backward into said other optical instrument and sighting through said telescope carried on said trunnions while said instrument is so adjusted, said sight openings in the trunnions and telescope and the semi-transparent mirror being such that a plurality of said optical sighting instruments may be arranged with their trunnion axes substantially in alignment with the line of sight of said other optical instrument and each used to locate points in planes perpendicular to said line of sight as determined by images on the line of sight of said other optical instrument being reflected back from the respective plane reflecting surfaces of the semitransparent mirrors in the plurality of said optical sighting instruments backward into said other optical instrument and sighting through the telescopes of said respective optical sighting instruments.

5. An optical sighting instrument of precision for accurately determining lines or planes perpendicular to an optical reference line comprising, a telescope having a barrel containing aligned lenses for view of objects in the line of sight thereof, opposed trunnions extending from the telescope barrel and defining an axis perpendicular to the line of sight of the telescope, bearings supporting said trunnions for rotation about their axis, an adjustable standard supporting said bearings, adjustable means on the trunnions and standard engaging said bearings for retaining said trunnions and telescope against lateral movement relative to said standard, said trunnions and telescope barrel having aligned sight openings extending entirely therethrough substantially axially of the trunnions, a ring member mounted on the end of one of the trunnions and having an end portion substantially concentric with the trunnion axis with an end face of spherical contour of relatively large radius, the center of said spherical contour being substantially in alignment with the trunnion axis, a second ring member having a face portion of spherical contour corresponding to the spherical contour portion of the first named ring member, said ring members having through central openings aligned with the sight opening in the trunnions, said second ring member having a frusto-conical periphery converging in a direction opposite from the telescope, an optical flat semi-transparent mirror having a plane reflecting surface and supported on the second ring member in covering relation to the central opening therethrough so the plane of the reflecting surface is perpendicular to the axis of the trunnions and thereby parallel to the plane generated by the line of sight of the telescope as the telescope is rotated on its trunnions, a plurality of adjustable means on the first named ring member and engaging the periphery of the second ring member substantially radially thereof for retaining the said spherical contours engaged and for moving the second ring member laterally relative to the first named ring member to position the plane reflecting surface of the semi-transparent member perpendicular to the axis of said trunnions, the perpendicularity of the plane reflecting surface to the axis of the trunnions being determinable by observing a fixed point in the line of sight of the telescope while observing through another optical instrument having fixed location an image reflected from said plane reflecting surface and then rotating the standard 180° about its axis and rotating the telescope 180° about the axis of its trunnions whereby the image reflected from the opposite side of the plane reflecting surface may again be observed through said other optical instrument while observing said fixed point in the line of sight of said telescope, whereby points may be located in a plane perpendicular to the optical line of sight of another optical instrument by adjusting said standard to make the axis of said trunnions parallel to the optical line of sight of said other optical instrument as determined by an image on the line of sight of said other optical instrument being reflected from said plane reflecting surface backward into said other optical instrument and sighting through said telescope carried on said trunnions while said instrument is so adjusted.

6. An optical sighting instrument of precision for accurately determining lines or planes perpendicular to an optical reference line comprising, a telescope having a barrel, an objective lens mounted at one end of the barrel, an eye piece including a lens mounted at the other end of the barrel, a focusing lens intermediate the ends of the barrel, means for moving the focusing lens longitudinally of the barrel for adjusting the focus of the telescope, an erector lens supported intermediate the focusing lens and the eye piece lens, a reticle in the telescope barrel intermediate the focusing lens and the erector lens, a tubular member mounted in the telescope barrel intermediate the eye piece lens and the erector lens and having an opening therethrough communicating with the interior of the telescope barrel, a filter lens in the tubular member adjacent the telescope barrel, a source of light mounted in the tubular member and arranged to direct rays of light through the filter lens into the telescope barrel substantially at right angles to the line of sight of the telescope, a prismatic mirror, means swingably mounting the prismatic mirror in the telescope barrel whereby said mirror is swingable from a position out of the line of sight of the telescope into a position in the line of sight for reflecting the rays of light from the light source through the line of sight of the telescope to project the reticle on distant objects, opposed trunnions extending from the telescope barrel, means for adjusting the line of sight of said telescope perpendicular to the axis of the trunnions, bearings supporting said trunnions for rotation about their axis, an adjustable standard supporting said bearings, means rotatably mounting said standard for rotation about a vertical axis perpendicular to the axis of the trunnions, said trunnions and telescope barrel having aligned sight openings extending entirely therethrough substantially axially of the trunnions, a semi-transparent mirror having a plane reflecting surface mounted on one of the trunnions so that the plane of the reflecting surface is perpendicular to the axis of the trunnions and thereby parallel to the plane generated by the line of sight of the telescope as the telescope is rotated on its trunnions, and mounting means for said semi-transparent mirror for positioning the plane reflecting surface of said mirror perpendicular to the axis of said trunnions, the perpendicularity of the plane reflecting surface to the axis of the trunnions being determinable by observing a fixed point in the line of sight of the telescope while observing through another optical instrument having fixed location an image reflected from said plane reflecting surface and then rotating the standard 180° about its axis and rotating the telescope 180° about the axis of its trunnions whereby the image reflected from the opposite side of the plane reflecting surface may again be observed through said other optical instrument while observing said fixed point in the line of sight of said telescope, whereby points may be located in a plane perpendicular to the optical line of sight of another optical instrument by adjusting said standard to make the axis of said trunnions parallel to the optical line of sight of said other optical instrument as determined by an image on the line of sight of said other optical instrument being reflected from said plane reflecting surface backward into said other optical instrument and sighting through said telescope carried on said trunnions while said instrument is so adjusted.

References Cited in the file of this patent

UNITED STATES PATENTS

| | | |
|---|---|---|
| 1,159,510 | Leitz | Nov. 9, 1915 |
| 1,434,209 | Hort | Oct. 21, 1922 |
| 1,864,896 | Egy | June 28, 1932 |
| 2,219,275 | Gruber et al. | Oct. 22, 1940 |
| 2,280,057 | Brunson | Apr. 21, 1942 |
| 2,285,723 | Kerrigan | June 9, 1942 |
| 2,335,066 | Lamar | Nov. 23, 1943 |
| 2,363,877 | Larsen et al. | Nov. 28, 1944 |
| 2,405,441 | Martin | Aug. 6, 1946 |
| 2,466,015 | Ewing | Apr. 5, 1949 |
| 2,570,275 | Reading | Oct. 9, 1951 |
| 2,638,814 | Keuffel et al. | May 19, 1953 |
| 2,647,320 | Keuffel et al. | Aug. 4, 1953 |
| 2,774,275 | Keller | Dec. 18, 1956 |

FOREIGN PATENTS

| | | |
|---|---|---|
| 285,426 | Germany | June 30, 1915 |